United States Patent
Ito

(10) Patent No.: US 6,595,425 B1
(45) Date of Patent: Jul. 22, 2003

(54) MECHANISM AND METHOD FOR HOLDING PORTABLE INFORMATION CARD, AND INFORMATION APPLIANCE USING THE MECHANISM

(75) Inventor: Takeharu Ito, Tokyo (JP)

(73) Assignee: NEC Corporation, Tokyo (JP)

(*) Notice: Subject to any disclaimer, the term of this patent is extended or adjusted under 35 U.S.C. 154(b) by 104 days.

(21) Appl. No.: 09/589,807

(22) Filed: Jun. 9, 2000

(30) Foreign Application Priority Data

Jun. 10, 1999  (JP) .......................................... 11-163872

(51) Int. Cl.[7] ................................................ G06K 7/00
(52) U.S. Cl. ....................................................... 235/486
(58) Field of Search ................................. 235/486, 382; 439/159

(56) References Cited

U.S. PATENT DOCUMENTS

| | | | | |
|---|---|---|---|---|
| 3,595,042 A | * | 7/1971 | Sedley | 70/276 |
| 4,602,150 A | * | 7/1986 | Nishikawa et al. | 235/382 |
| 5,202,551 A | * | 4/1993 | Parrer et al. | 235/441 |
| 5,470,241 A | * | 11/1995 | Kaufman et al. | 439/159 |
| 5,850,079 A | * | 12/1998 | Ohwa et al. | 194/351 |
| 5,933,085 A | * | 8/1999 | Holcomb et al. | 165/200 |
| 6,254,005 B1 | * | 7/2001 | Smith et al. | 235/475 |

* cited by examiner

Primary Examiner—Michael G. Lee
Assistant Examiner—Lisa M. Caputo
(74) Attorney, Agent, or Firm—Sughrue Mion, PLLC

(57) ABSTRACT

A Portable information appliance having a PC card slot is equipped with a card locking mechanism that is actuated in operative association with insertion of the PC card to prevent theft of the PC card and enhance ease of use. When a PC card is inserted into an opening, a release support member which operates in association with the PC card is actuated and a side arm is thrust forward in operative association with the release support member. An internally accommodated projecting portion, which is slidably attached to the distal end of the side arm and has a first locking portion on its first end, is thrust outwardly by the side arm. When the projecting portion emerges to the exterior, it turns about a support point, becomes parallel to the opening, is slid and secured, thereby closing the opening.

20 Claims, 5 Drawing Sheets

MECHANISM AND METHOD FOR HOLDING PORTABLE INFORMATION CARD, AND INFORMATION APPLIANCE USING THE MECHANISM

FIELD OF THE INVENTION

This invention relates to an information appliance and, more particularly, to a portable information card holding mechanism and method used in a portable information appliance to prevent the theft of a personal computer card (PC card) inserted into a slot of the appliance. The invention relates further to an information appliance that uses this card holding mechanism.

BACKGROUND OF THE INVENTION

Though a portable information appliance such as a notebook-type personal computer is such that theft of the computer itself can be prevented by a lock device connected to the case, a PC card serving as a peripheral device is merely inserted into a card insertion opening of the case through a card slot in compliance with the PCMCIA (Personal Computer Memory Card Interface Association) standards. As a consequence, the PC card accommodated within the card insertion opening can readily be extracted by anyone. In order to deal with this situation, the specification of Japanese Patent Kokai Publication (Laid-Open) JP-A-11-6889 discloses an arrangement in which a PC card insertion port is operatively associated with the turning of a lock mechanism on the main body of the apparatus so as to be closed by a theft prevention cover.

SUMMARY OF THE DISCLOSURE

The following problem has been encountered in the course of investigations toward the present invention. Though this prior-art device for preventing theft of a PC card makes it possible to prevent the theft of a PC card that has been inserted into a slot, the lock mechanism can be operated even if a PC card has not been inserted. If the lock mechanism has already been locked before a PC card is inserted into the slot, therefore, the mechanism must be unlocked in order for the card to be inserted.

According to a second aspect, there is provided a method of holding a portable information card according to the present invention. The method comprises the steps of: rendering movable a release support member, which is operatively associated with a portable information card, when the portable information card has been inserted from an opening; thrusting a release member forward in operative association with the release support member; thrusting an internally accommodated projecting portion outwardly by the release member and turning it when it emerges to the exterior, the projecting portion being freely slidably attached to a distal end of the release member and having one end provided with a first locking portion; sliding and securing the projecting port ion when it becomes parallel to the opening to thereby close the opening; and effecting locking by engaging the first locking portion and a second locking portion which opposes the first locking portion.

According to a third aspect of the present invention, there is provided a mechanism for holding a portable information card, comprising:

a lever member operating in association with a portable information card when the portable information card is inserted into a card insertion opening;

an arm member being thrust forward in operative association with the lever member;

a projecting member freely slidably attached to a distal end of the arm member and having one end provided with a first locking portion, the projecting portion being thrust outwardly from the holding mechanism in association with the arm member, the projecting portion being configured capable of being fully extracted to be for sliding to be secured when becoming parallel to the opening to thereby close the opening;

an accommodating recess for accommodating the release member and the projecting member; and a locking mechanism that effects locking by engaging the first locking portion and a second locking portion which opposes the first locking portion at the parallel state.

According to a fourth aspect of the present invention, there is provided a mechanism for holding a portable information card comprising:

means for rendering movable a release support member, which is operatively associated with a portable information card, when the portable information card has been inserted from an opening;

means for thrusting a release member forward in operative association with the release support member;

means for thrusting an internally accommodated projecting portion outwardly by the release member and turning it when it emerges to the exterior, the projecting portion being freely slidably disposed at a distal end of the release member and having one end provided with a first locking portion;

means for sliding and securing the projecting portion when it becomes parallel to the opening to thereby close the opening; and means for effecting locking between the first locking portion and a second locking portion disposed on the mechanism.

The mechanism further comprises:

means for generating an alarm upon extraction of the portable information card at a closed state of the projecting portion for the opening.

The alarm comprises an alarm signal either directly or indirectly.

Accordingly, an object of the present invention is to provide a mechanism and method for holding a portable information card, as well as a portable information appliance which uses the mechanism, in which theft of a portable information card such as a PC card can be prevented while, at the same time, it is so arranged that the lock mechanism always operates in operative association with insert ion of a PC card.

According to a first aspect of the present invention, there is provided a mechanism holding a portable information card, comprising: a release support member operating in association with a portable information card when the portable information card is inserted into a card insertion opening; a release member being thrust forward in operative association with the release support member; a projecting portion freely slidably attached to a distal end of the release member and having one end provided with a first locking portion, the projecting portion being thrust outwardly from the holding mechanism by the release member, the projecting portion being configured capable of being turned upon emerging to the exterior, and then being slid and secured when becoming parallel to the opening to thereby close the opening; an accommodating recess for accommodating the release member and the projecting portion; and a locking mechanism portion effecting locking by engaging the first locking portion and a second locking portion which opposes the first locking portion.

PREFERRED EMBODIMENTS OF THE INVENTION

In a preferred embodiment, the mechanism further comprises an alarm detector, which is provided at a position where the projecting portion opposes the opening, to be actuated if the portable information card is extracted when the projecting portion has closed the opening; an alarm circuit detecting actuation of the alarm detector and generating an alarm signal; and an alerting device outputting an alert in response to the alarm signal. The release member and the projecting member are accommodated within the accommodating recess when the portable information card has not been inserted. The release support member thrusts the release member forward by the lever principle. Further, the locking mechanism portion may be of electronic locking type.

An information appliance in accordance with the present invention uses a mechanism for holding a portable information card, the mechanism comprising: a release support member for operating in association with a portable information card when the portable information card is inserted into a card insert ion opening; a release member for being thrust forward in operative association with the release support member; a projecting portion freely slidably attached to a distal end of the release member and having one end provided with a first locking portion, the projecting portion being thrust outwardly from the mechanism by the release member and being turned upon emerging to the exterior, the projecting portion then being slid and secured when becoming parallel to the opening to thereby close the opening; an accommodating recess for accommodating the release member and the projecting portion; and a locking mechanism portion for effecting locking by engaging the first locking portion and a second locking portion which opposes the first locking portion.

Further, an information appliance in accordance with the present invention uses a mechanism for holding a portable information card, the mechanism comprising: a release support member for operating in association with a portable information card when the portable information card is inserted into a card insertion opening; a release member for being thrust forward in operative association with the release support member; a projecting portion freely slidably attached to a distal end of the release member and having one end provided with a first locking portion, the projecting portion being thrust outwardly from the mechanism by the release member and being turned upon emerging to the exterior, the projecting portion then being slid and secured when becoming parallel to the opening to thereby close the opening; an accommodating recess for accommodating the release member and the projecting portion; a locking mechanism portion for effecting locking by connecting the first locking portion and a second locking portion which opposes the first locking portion; alarm detection means, which is provided at a position where the projecting port ion opposes the opening, for being actuated if the portable information card is extracted when the projecting portion has closed the opening; an alarm circuit for detecting actuation of the alarm detection means and generating an alarm signal; and alerting means for outputting an alert in response to the alarm signal.

In a preferred embodiment, the method further comprises the steps of: actuating an alarm detector if the portable information card is extracted at a closed state of the projecting portion for the opening; detecting actuation and generating an alarm signal; and outputting an alert in response to the generated alarm signal.

In accordance with the present invention, a PC card, which is one type of portable information card, is inserted into a plastic frame which forms a PC card slot and which is mounted in a portable information appliance. When the PC card is inserted, a side arm is thrust forward in operative association with the insertion of the card. One end of the arm serves as an obstruction which prevents unauthorized extraction of the PC card. The other end of the arm is provided with a locking mechanism that is secured at a locking position. As a result, the locking mechanism is always actuated in operative association with insertion of the PC card. This makes it possible to effectively prevent theft of the PC card and to improve ease of operation.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
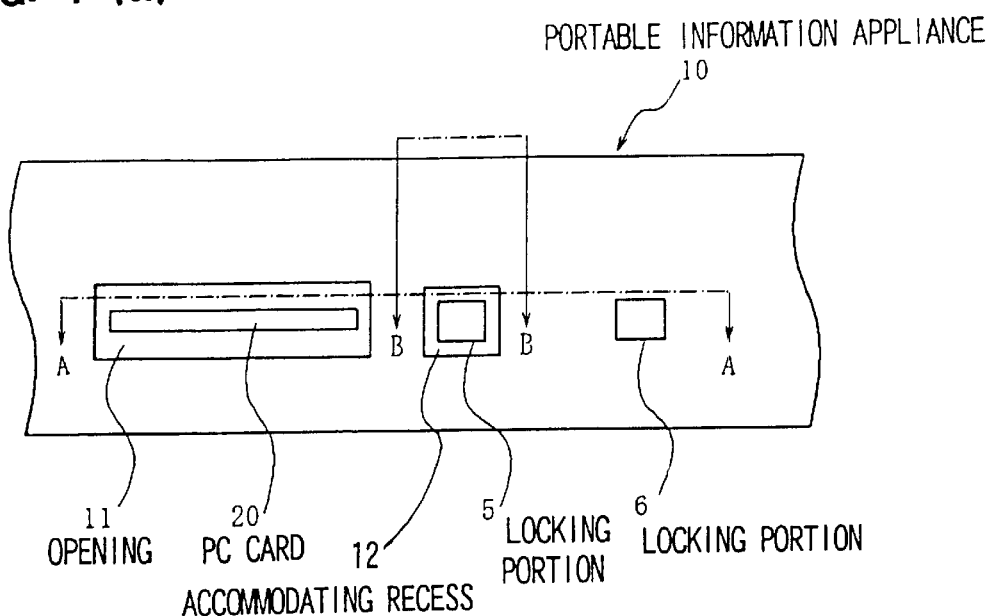
FIG. 1A is a diagram illustrating the front side of a portable information card holding mechanism according to a first embodiment of the present invention.
FIG. 1B is a sectional view taken along line A—A of FIG. 1A and illustrating a PC card in the process of being inserted.
Figure 1:
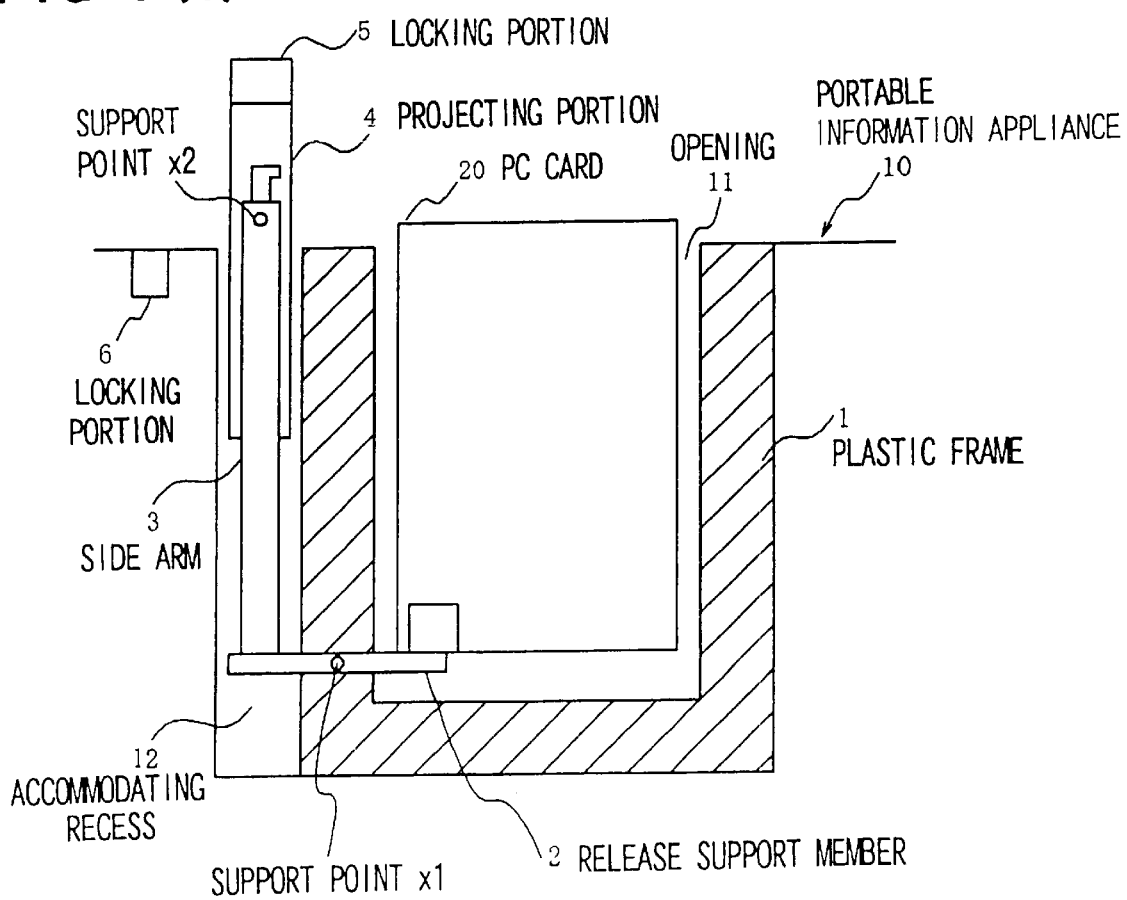

Preferred embodiments of the present invention will now be described in detail with reference to the accompanying drawings.

A mechanism for holding a portable information card according to the present invention is used primarily in an information appliance such as a personal computer, particularly a notebook-type portable information appliance having a PC card slot. FIG. 1A is a diagram illustrating the front side of a portable information card holding mechanism according to a first embodiment of the present invention, and FIG. 1B is a sectional view taken along mine A—A of FIG. 1A and illustrating a PC card in the process of being inserted.

As shown in FIG. 1A, a PC card 20 is inserted into an opening 11 of a portable information appliance 10, and a locking portion 5 of locking portions 5, 6 constituting a locking mechanism is accommodated in an accommodating recess 12. As best shown in FIG. 1B, the mechanism for holding the PC card 20 includes: a release support member 2 for operating in association with the PC card 20 when the PC card 20 is inserted into the card insertion opening 11; a side arm 3 serving as a release member for being thrust forward in operative association with the release support member 2; a projecting portion 4 freely slidably attached to a distal end of the side arm 3 and having a first end provided with the first locking portion 5, the projecting portion 4 being thrust outwardly from the mechanism by the side arm 3 and being turned upon emerging to the exterior, the projecting portion 4 then being slid and secured when becoming parallel to the opening 11 to thereby close the opening 11; an accommodating recess 12 for accommodating the side arm 3 and the projecting portion 4; and a locking mechanism for locking the PC card 20 by engaging the first locking portion 5 and a second locking portion 6 which opposes the first locking portion 5.

As shown in FIG. 1B, a plastic frame 1 guides the PC card 20 when the PC card 20 is inserted in the opening 11. The side arm 3 and the projecting portion 4 are accommodated within the accommodating recess 12 when the PC card 20 has not been inserted. The release support member 2, which is formed as a lever to be fastened to the plastic frame 1 at a support point x1, thrusts the side arm 3 forward in accordance with the lever principle. The distal end of the side arm 3 has a support point x2 about which the projecting portion 4 is capable of turning. The locking mechanism is of the electronic locking type but may be constructed using an ordinary key to provide an effective lock. A key is not shown in the drawings.

Operation will now be described with reference to FIGS. 1 to 3.

When the PC card 20 is inserted into the opening 11, the release support member 2 which operates in association with the PC card 20 is actuated and the side arm 3 is thrust forward in operative association with the release support member 2. The internally accommodated projecting portion 4, which is slidably attached to the distal end of the side arm 3 and has the first locking portion 5 on its first end, is thrust outwardly by the side arm 3. When the projecting portion 4 emerges to the exterior, it turns about the support point x2, becomes parallel to the opening 11, as shown in FIG. 3, is slid and secured, thereby closing the opening 11. Locking of the PC card 20 is achieved by connecting the first locking portion 5 and the second locking portion 6 which opposes the first locking portion 5. When the PC card 20 is normally extracted, it will suffice to disengage the locking portions and follow a procedure that is the reverse of that described above.

The foregoing operation will now be described in greater detail with reference to FIGS. 1 to 6.

First, in FIG. 1B, the PC card 20 is illustrated in the processing of being inserted from the opening 11. The PC card 20 is guided into the plastic frame 1 provided in a PC card slot. When the PC card 20 has been inserted up to the support point x1 from the opening 11, the release support member 2 is Pushed by the PC card 20. Owing to this pushing force, the release support member (i.e., a lever) 2 thrusts the side arm 3 in a direction opposite the PC card insertion direction, namely in the forward direction, in accordance with the principle of the lever.

Figure 2:
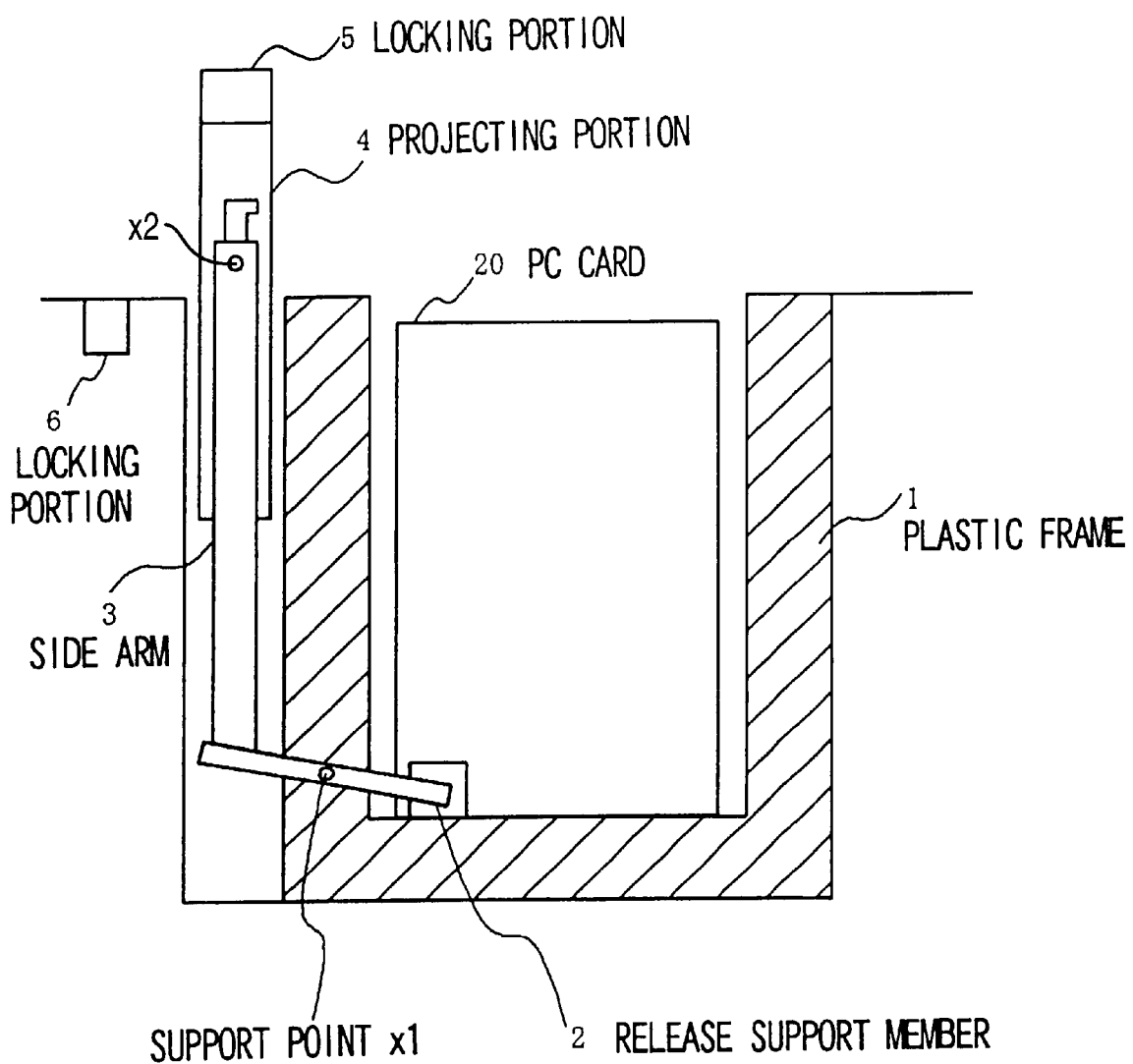
FIG. 2 is a sectional view taken along line A—A of FIG. 1A and illustrating the PC card fully inserted.

FIG. 2 shows the PC card 20 fully inserted. After it has been confirmed that the PC card 20 is fully inserted, the projecting portion 4 attached to the distal end of the side arm 3 is pulled fully to extract the projecting portion 4 out of the accommodating recess 12, followed by turning about the support point x2 on the side arm by the operator of the PC card 20.

Figure 3:
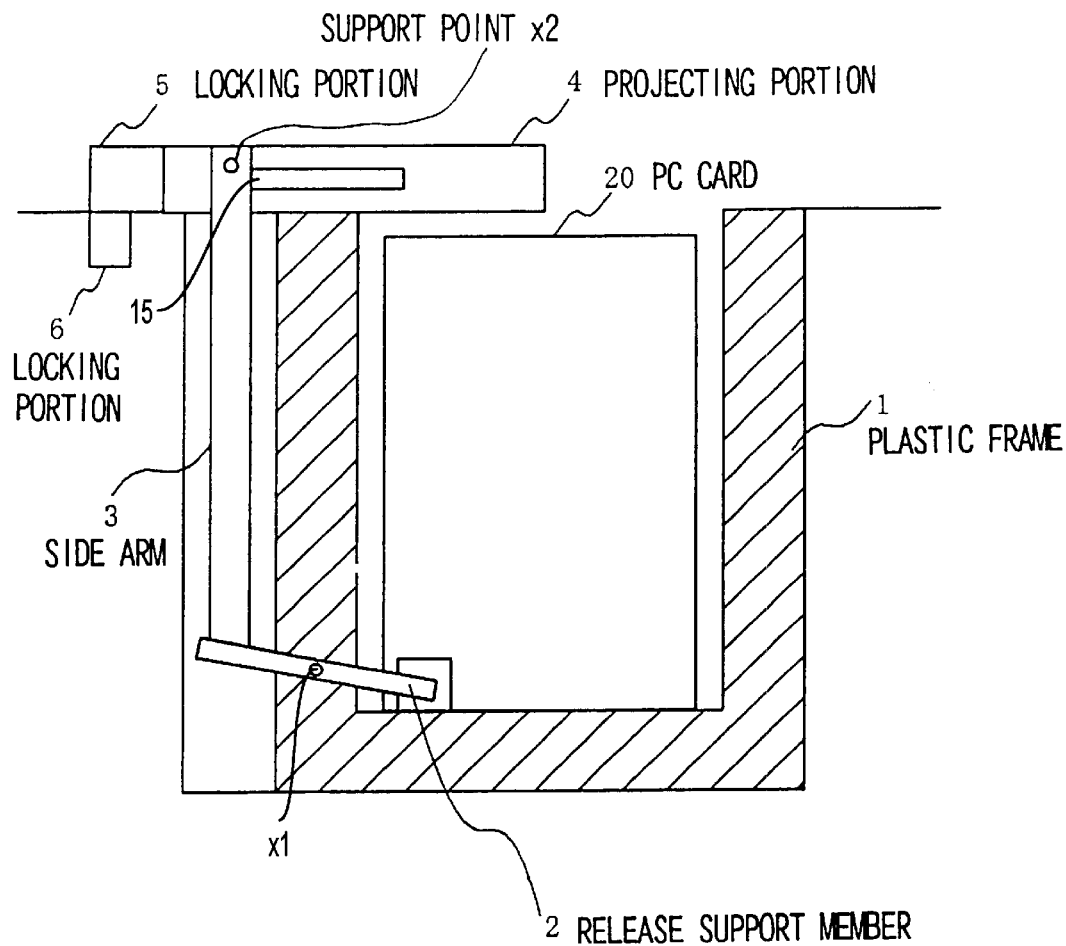
FIG. 3 is a sectional view taken along line A—A of FIG. 1A and illustrating the PC card fully inserted and locked.

FIG. 3 shows the PC card fully inserted and locked. After the projecting portion 4 has been turned about the support point x2, it is slid and secured when it becomes parallel to the opening 11. The opening 11 is closed by the second end of the projecting portion 4. The PC card 20 is locked by connecting the first locking port ion 5 and the opposing second locking portion 6. As can be seen from FIG. 3, the groove 15 extends substantially in a length that allows a full extraction of the lower end of the projecting portion 4 so as to permit the projecting portion 4 to turn about the support point x2.

Figure 4:
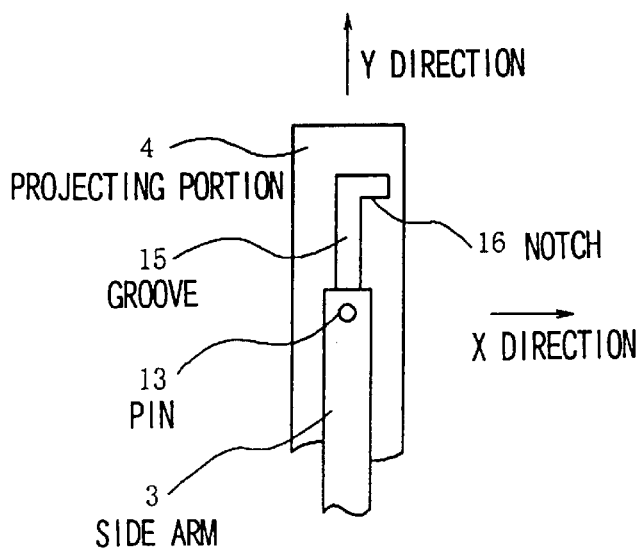
FIG. 4 is a diagram illustrating a side arm and the distal end of a projecting portion depicted in FIG. 1A.
Figure 5:
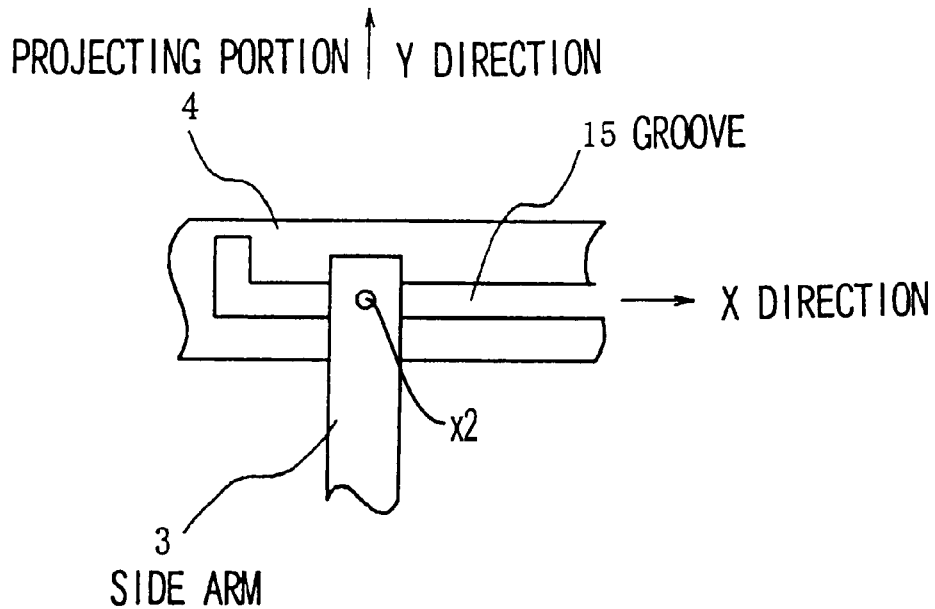
FIGS. 5A and 5B are diagrams illustrating the side arm and the distal end of the projecting portion depicted in FIG. 1A.
Figure 5:
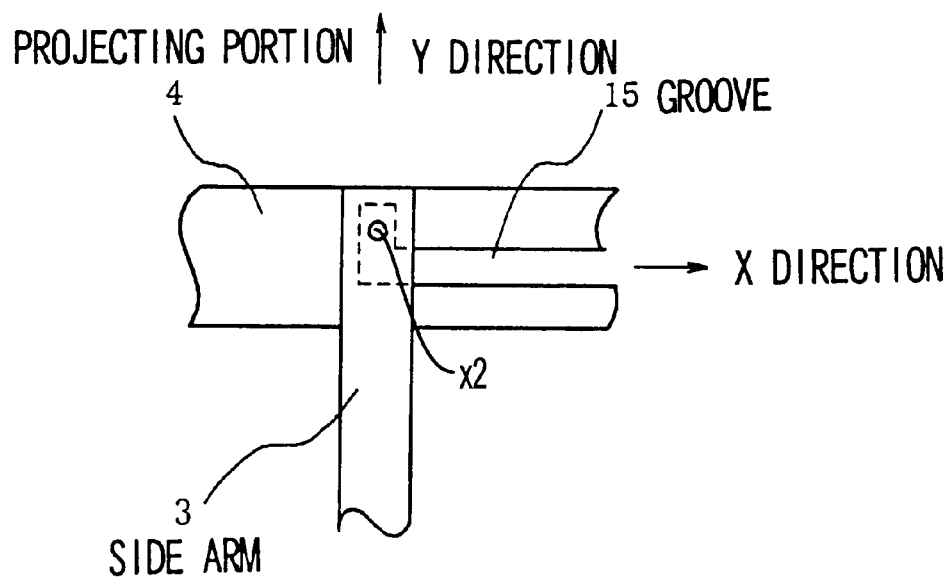

FIGS. 4 and 5A, 5B are enlarged views showing the first end of the projecting portion 4 and the distal end of the side arm 3. The projecting portion (capable of being pulled in Y-direction) 4, which has been turned about a pin 13 at the support point x2 (FIGS. 5A, 5B), is capable of being moved in the X direction in FIGS. 5A, 5B while being guided by a groove 15 provided in its side. The groove 15 has a locking notch 16 formed in one end. When the projecting portion 4 has become parallel to the X axis, i.e., to the side face of the case of the portable information appliance 10, the projecting portion 4 is slid in the X direction while being guided by the groove 15.

When the pin 13 has arrived at the end of the groove 15, the projecting portion 4 is moved in the Y direction in such a manner that the pin 13 will fit into (fixedly mate with) the notch 16 of the groove 15. FIG. 5B shows the pin 13 fitted into (mated with) the notch 16. The spacing between the PC card 20 and the projecting portion 4 is reduced by the amount of downward movement of the projecting portion 4 along the Y axis, thereby establishing a state in which the PC card 20 cannot be forcibly extracted. While the second end of the Projecting portion 4 prevents the extract ion of the PC card 20, the first end provided with the first locking portion 5 is engaged with the second locking portion 6, which is provided on the portable information appliance 10, in order to secure the projecting portion 4.

By setting the locking mechanism, which comprises the first and second locking portions 5, 6, at a locking position and at a lock-release position using a key, the projecting portion 4 can be selectively fixed or rendered movable. Extraction of the PC card 20 is restricted by the projecting portion 4 that closed the slot opening. Since the card holding mechanism of this embodiment is such that the locking mechanism can be actuated only in operative association with the insertion of the PC card, theft of the PC card can be prevented and the apparatus is made easier to use.

Figure 6:
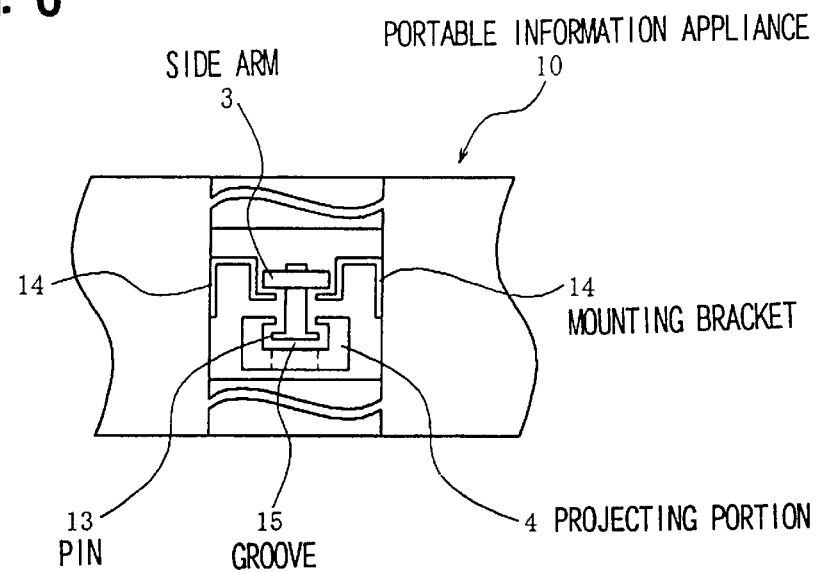
FIG. 6 is a diagram showing the relationship between an example of attaching the side arm of FIG. 1A and the projecting portion.

FIG. 6 is a sectional view taken along line B—B of FIG. 1A and illustrates the relationship between the attachment of the side arm 3 and the projecting portion 4. The first locking portion 5 is not shown in order to make the relationship easier to understand. The side arm 3 is attached to the portable information appliance 10 by a mounting bracket 14 having a slidable rail structure. The projecting portion 4 is slidable by the pin 13 with the groove 15 serving as a guide.

Figure 7:
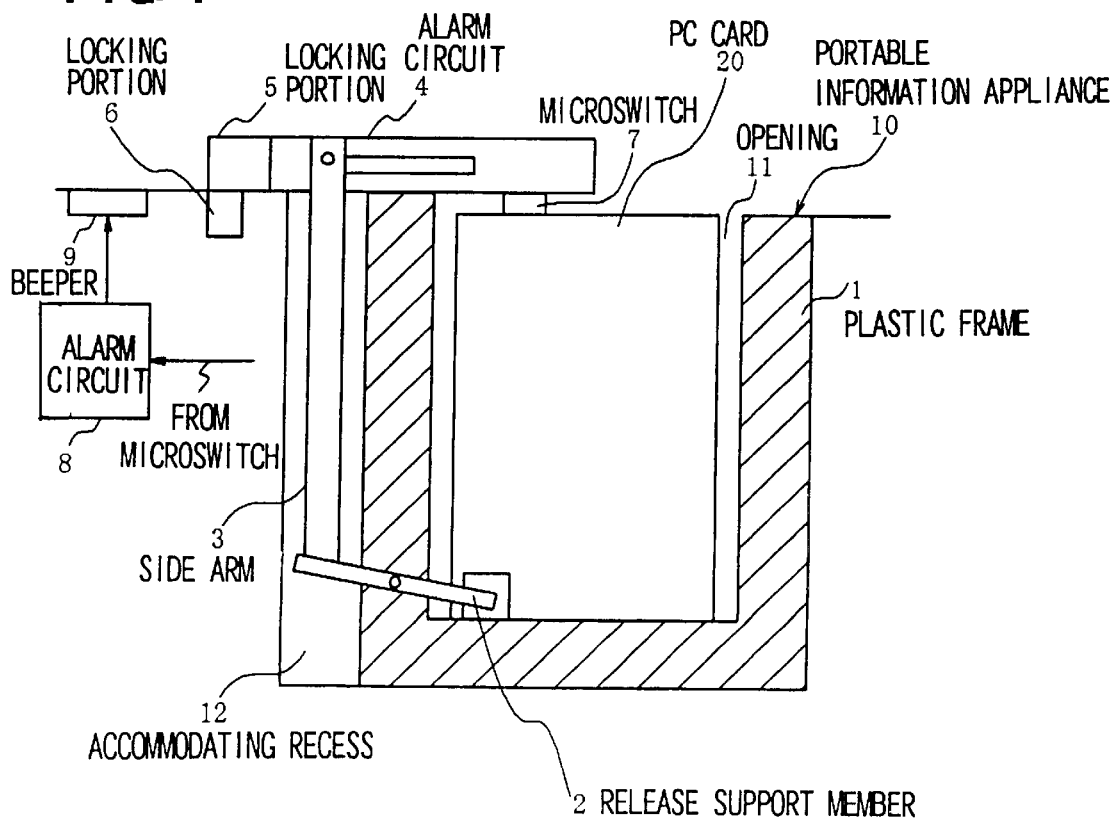
FIG. 7 is a diagram illustrating a second embodiment of the present invention.

A second embodiment of the present invention will be described with reference to FIG. 7. Particulars other than those set forth below are similar to those of the first embodiment and need not be illustrated or described again.

Here the mechanism for holding a portable information card further includes a microswitch 7 provided at the position where the projecting portion 4 opposes the opening 11 and actuated if an attempt is made to extract the PC card 20 when the opening 11 is closed by the projecting portion 4, an alarm circuit 8 for detecting actuation of the microswitch 7 and generating an alarm signal and a beeper 7 for outputting an alert tone in response to the alarm signal.

If an attempt is made to extract the PC card 20 when the projecting portion 4 has closed the opening 11, the microswitch 7 is actuated. This is detected and an alarm signal is generated by the alarm circuit 8, and the beeper 9 outputs an alert tone in response to the generated alarm signal. This prevents the PC card from being damaged owing to inadvertent extraction and makes it possible to prevent malfunctioning of the information appliance.

In operation, the locking portions 5 and 6 of the locking mechanism are set at the locking position by a key, which is not shown. When this has been accomplished, power is supplied to the portable information appliance 10 from a power supply (not shown) in order to prepare for actuation of the microswitch 7 provided on the second end of the projecting portion 4. If it is attempted to forcibly extract the PC card 20 under these conditions, the PC card 20 will contact the microswitch 7 provided on the projecting portion 4, thereby closing the switch. The closed microswitch 7 sends a signal to the alarm circuit 8, which proceeds to send a signal to the beeper 9 so that the latter will emit a beeping tone as an alert. As a result, the beeper 9 emits the beeping tone to warn of the fact that an unauthorized activity has taken place.

Thus, in accordance with the present invention as described above, two effects are provided in an information appliance into which a PC card can be inserted as an extension. The first is that the opening into which the PC card is inserted is closed, and a locking mechanism is actuated, by a projecting portion in operative association with the insertion of the PC card, thereby furnishing greater ease of use and preventing theft of the PC card per se. The second is that since unauthorized extraction of the PC card is forcibly prevented by alarm detect ion means, the PC card 20 is prevented from being damaged owing to inadvertent extraction and it is possible to prevent malfunctioning of the information appliance.

As many apparently widely different embodiments of the present invent ion can be made without departing from the spirit and scope thereof, it is to be understood that the invention is not limited to the specific embodiments thereof except as defined in the appended claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A mechanism for holding a portable information card, comprising:
    a release support member operating in association with a portable information card when the portable information card is inserted into a card insertion opening;
    a release member being thrust forward in operative association with said release support member;
    a projecting portion freely slidably attached to a distal end of said release member and having one end provided with a first locking portion, said projecting portion being thrust outwardly from the holding mechanism by said release member, said projecting portion being configured capable of being turned and then being slid and secured when becoming parallel to the opening to thereby close the opening;
    an accommodating recess for accommodating said release member and said projecting portion; and
    a locking mechanism that effects locking by engaging the first locking portion and a second locking portion which opposes said first locking portion.

2. The mechanism according to claim 1, further comprising:
    alarm detector, which is provided at a position where said projecting port ion opposes the opening, and is actuated if the portable information card is extracted at a closed state of the opening;
    an alarm circuit detecting actuation of said alarm detector and generating an alarm signal; and
    an alerting device outputting an alert in response to the alarm signal.

3. The mechanism according to claim 1, wherein said release member and said projecting member are accommodated within said accommodating recess when the portable information card has not been inserted.

4. The mechanism according to claim 1, wherein said release support member thrusts said release member forward in accordance with the lever principle.

5. The mechanism according to claim 1, wherein said locking mechanism is a key locked mechanism.

6. An information appliance which uses the mechanism for holding the portable information card set forth in claim 1.

7. The mechanism according to claim 1, wherein said projecting portion comprises a groove extending along a length of the projection portion having a locking notch at one end thereof.

8. The mechanism according to claim 7, wherein said locking notch is configured to allow said projecting portion to be pressed down toward the inserted card so as to secure the card in the inserted state.

9. The mechanism according to claim 8, wherein said locking mechanism becomes an actuatable state upon said pressing down of said projecting portion toward the inserted card.

10. The mechanism according to claim 9, wherein said locking is actuated by key-locking.

11. The mechanism according to claim 8, wherein the groove retains the projecting portion at a locking position upon the slide movement of the projecting portion parallel to the opening.

12. The mechanism according to claim 1, wherein said release support member comprises a lever pivotably supported to the mechanism.

13. The mechanism according to claim 12, wherein said release member comprises an arm member slidably disposed in said recess.

14. The mechanism according to claim 1, wherein the second locking portion is provided on the holding mechanism.

15. A mechanism for holding a portable information card, comprising:
    a lever member operating in association with a portable information card when the portable information card is inserted into a card insertion opening;
    an arm member being thrust forward in operative association with said lever member;
    a projecting member freely slidably attached to a distal end of said arm member and having one end provided with a first locking portion, said projecting portion being thrust outwardly from the holding mechanism in association with said arm member, said projecting portion being configured capable of being turned for sliding to be secured when becoming parallel to the opening to thereby close the opening;

an accommodating recess for accommodating said arm member and said projecting member; and a locking mechanism that effects locking by engaging the first locking portion and a second locking portion which opposes said first locking portion at said parallel state.

16. The mechanism according to claim 15, further comprising:

alarm detector, which is provided at a position where said projecting member opposes the opening, and is actuated if the portable information card is extracted at a closed stage of the opening;

an alarm circuit detecting actuation of said alarm detector and generating an alarm signal; and an alerting device outputting an alert in response to the alarm signal.

17. A method of holding a portable information card comprising the steps of:

rendering movable a release support member, which is operatively associated with a portable information card, when said portable information card has been inserted from an opening;

thrusting a release member forward in operative association with the release support member;

thrusting a projecting portion outwardly by the release member and turning it, said projecting portion being freely slidably disposed at a distal end of the release member and having one end provided with a first locking portion;

sliding and securing the projecting portion when it becomes parallel to the opening to thereby close the opening; and effecting locking by engaging the first locking portion and a second locking portion which opposes the first locking portion.

18. The method according to claim 17, further comprising the steps of:

actuating an alarm detector upon extraction of the portable information card is at a closed state of the projecting portion for the opening;

detecting actuation and generating an alarm signal; and outputting an alert in response to the generated alarm signal.

19. A mechanism for holding a portable information card comprising:

means for rendering movable a release support member, which is operatively associated with a portable information card, when said portable information card has been inserted from an opening;

means for thrusting a release member forward in operative association with the release support member;

means for thrusting a projecting portion outwardly by the release member and turning it, said projecting portion being freely slidably disposed at a distal end of the release member and having one end provided with a first locking portion;

means for sliding and securing the projecting portion when it becomes parallel to the opening to thereby close the opening; and means for effecting locking between the first locking portion and a second locking portion disposed on the mechanism.

20. The mechanism according to claim 19, further comprising means for generating an alarm signal upon extraction of the portable information card is at a closed state of the projecting portion for the opening.

* * * * *